(12) United States Patent
Guzman et al.

(10) Patent No.: US 8,158,696 B2
(45) Date of Patent: Apr. 17, 2012

(54) ASPHALT PRIME COAT

(76) Inventors: Fernando Javier Guzman, Sugar Land, TX (US); Edgar Franklin Hoy, Parrish, FL (US); Rudy Virgilio Montalvo, Wharton, TX (US)

( * ) Notice: Subject to any disclaimer, the term of this patent is extended or adjusted under 35 U.S.C. 154(b) by 513 days.

(21) Appl. No.: 12/319,745

(22) Filed: Jan. 12, 2009

(65) Prior Publication Data

US 2010/0179245 A1 Jul. 15, 2010

(51) Int. Cl.
*C08L 95/00* (2006.01)
*C09D 195/00* (2006.01)
*C09D 5/16* (2006.01)

(52) U.S. Cl. ............................... 523/122; 524/60; 524/62

(58) Field of Classification Search .................. 524/60, 524/62; 523/122
See application file for complete search history.

(56) References Cited

U.S. PATENT DOCUMENTS

| | | |
|---|---|---|
| 4,094,696 A | 6/1978 | Burris |
| 6,113,659 A | 9/2000 | Logaraj et al. |
| 6,143,812 A | 11/2000 | Martin et al. |
| 2005/0145136 A1 | 7/2005 | Butler et al. |
| 2006/0230981 A1 | 10/2006 | Dean |

OTHER PUBLICATIONS

International Search Report for Patent Application No. PCT/US10/00074, dated Aug. 3, 2010 (4 pages).

*Primary Examiner* — Kriellion Sanders
(74) *Attorney, Agent, or Firm* — The Matthews Firm

(57) ABSTRACT

An environmentally friendly composition and related methods of use and production of an asphalt prime coat, suitable for application to a base road structure, are described herein. The composition includes an asphaltine, and an emulsion of a natural hydrocarbon resin mixed with a penetrating component, which can include a very limited quantity an organic solvent, or can omit organic solvents. If organic solvents are omitted, a hydrophobic wax can be added for moisture retention and water impermeability. Dispersion agents can be used to facilitate penetration into the base road. Rheology modifying agents and/or alcohols can be used to add flexibility, decrease curing time, and improve thickness and viscosity. The prime coat contains a lower quantity of volatile organic compounds than conventional prime coats, reducing environmental impact. The drying time of the composition is less than alternative compositions. The improved dry time coupled with lower environmental liability can provide significant cost savings.

29 Claims, No Drawings

ASPHALT PRIME COAT

FIELD

The present embodiments relate, generally, to an environmentally friendly asphalt prime coat and related methods usable to bind an asphalt road or similar upper construction course with a base road, such as a compacted aggregated material.

BACKGROUND

Asphalt roads and other asphalt surfaces typically include a base road, formed from a compacted aggregated material, such as limestone, crushed concrete, or similar aggregates, and an asphalt binder disposed on the base road. The aggregated material transmits load from the surface of the road to the base, withstands the abrasive wear of traffic, and provides a non-skid surface. The asphalt binder holds the aggregated material together, preventing loss and displacement of material, and forms a waterproof seal for preventing water from entering or leaving the base road. Additionally, the asphalt binder serves to bond the first course of surface treatment to the base, to strengthen the top 0.05 to 2 inches of the base, to protect the base prior to application of materials to the surface, to create a workable platform on the base, and to help control debris due to dust.

Conventional asphalt binders, also referred to as prime coats, typically include one or more cutback asphalts, which combine liquid and solid asphalts with a variety of volatile organic compounds, hydrocarbons, and other solvents. A typical cutback asphalt contains primarily volatile organic solvents of varying grades, possibly mixed with a small amount of water or other additives, used to thin a mixture of asphalt and other hydrocarbons. Volatile organic solvents are environmentally unfriendly, can evaporate over time, causing extensive air pollution, and can wash from the surface of a road in the form of run-off, causing water pollution.

Cutback asphalts must be heated prior to application, increasing the time required to prepare and apply the prime coat while creating safety concerns related to handling the heated material. Often, application of cutback asphalts requires heating beyond the flash point of many of the materials, creating significant risk of fire. Further, after application, cutback asphalts require a significant amount of time to cure before a coated base road can be subjected to construction traffic. Due the significant quantity of hydrocarbons and other solvents that are present in cutback asphalts, a great deal of time is required for these volatile components to evaporate, before the base is dry and properly cured. After curing, excess cutback asphalt applied to a base road must be blotted and cleaned to prevent evaporation or run-off. Additionally, the solvents in cutback asphalts can be potentially unsafe for construction personnel to handle without taking cumbersome precautions, and can be potentially unsafe for individuals who reside close to a site where cutback asphalts are in use.

Due to the environmental damages and human liability inherent when using cutback asphalts, use of cutback asphalts has become increasingly subject to environmental regulations. In many states, use of cutback asphalts is restricted to unpopulated and minimally populated areas, such as sections of roadways between cities, while alternatives to cutback asphalt must be used within and proximate to populated areas.

As a safer and less environmentally damaging alternative to cutback asphalts, emulsified asphalts have been developed, which contain smaller quantities of volatile organic compounds than cutback asphalts, do not require heating to apply, and cure more quickly than cutback asphalts. However, emulsified asphalts exhibit reduced effectiveness compared to cutback asphalts, primarily due to their high water content, among other factors. Use of asphalt emulsions often results in an improper cure for a base road and insufficient penetration into the base road. Additionally, while asphalt emulsions are considerably safer and less environmentally damaging than cutback asphalts, asphalt emulsions still contain a significant quantity of volatile organic compounds.

A need exists for an asphalt prime coat that contains a significantly lower quantity of hydrocarbon-related volatile organic compounds than other existing alternatives, including both cutback asphalts and emulsified asphalts, thereby substantially reducing or eliminating environmental concerns and human liability when applying or handling the materials, or when residing in proximity to a site where the asphalt prime coat is in use.

A further need exists for an environmentally friendly asphalt prime coat that overcomes the limited functionality of conventional emulsified asphalts, such as by penetrating from 0.5 inches to 2 inches, or more, into a base road, while retaining the benefits of emulsified asphalts, including a rapid curing time and the ability to be applied without requiring heat or blotting of excess material.

A need also exists for an asphalt prime coat that can fully evaporate within twenty-four hours of application. Oil based prime coats, including asphalt emulsions, typically require three to seven days for evaporation. A prime coat that dries within a twenty-four hour lapse of its first application could generate significant cost savings for a general contractor or asphalt paving contractor.

The present embodiments meet these needs.

SUMMARY

In one embodiment, the present invention relates to a composition for an asphalt prime coat usable for application on a base road. The composition can include an asphaltine, and an emulsion containing a natural hydrocarbon resin and at least one penetrating component, which functions as a dispersion agent for formation of the emulsion and facilitates penetration of the composition into the base road.

The asphaltine can be disbursed, and can include any water-wet, aqueous, or similar solution of an asphalt or a similar mineral, which functions as a base for the present prime coat in combinations with the emulsion of natural hydrocarbon resin.

The natural hydrocarbon resin can include Gilsonite, or a substantially similar mineral. In one embodiment, the penetrating component can include a limited quantity of an organic solvent, such as an odorless mineral spirit, the organic solvent not exceeding ten percent by weight of the overall composition. Preferably, the organic solvent can be present in an amount ranging from one percent by weight to three percent by weight of the composition. In addition to facilitating penetration of the resulting asphalt prime coat into the base road structure, the organic solvent, when dissolved with the natural hydrocarbon resin, cures to form a membrane over a base road when applied, preventing the entry or exit of moisture from the base road after application of the prime coat. Conventional asphalt prime coats require a significantly larger quantity of volatile organic components to achieve adequate penetration and water impermeability.

In another embodiment, the composition can contain no organic solvents, and the penetrating component can include other compounds able to function as a dispersion agent for the emulsion and to facilitate penetration into the base road, such as combinations of polyglcerine, water, and/or other similar materials. To substitute for the interactions between the organic solvent and the natural hydrocarbon resin that form a water impermeable membrane, a hydrophobic wax can be added, which fills gaps within the prime coat matrix, while providing the present composition with the ability to cure and repel water, thereby retaining moisture within the compacted aggregate material of the base road while preventing the entry of external moisture. The hydrophobic wax can include slack paraffin, another hydrophobic and/or liquid wax, another polyethylene wax, and/or another wax emulsion.

In an embodiment, one or more dispersion agents can be added to the composition to prevent clumping of the materials, to facilitate penetration of the prime coat to a greater depth into the base road, and to decrease the time required for the prime coat to fully cure.

In another embodiment, one or more rheology modifying agents can be added to increase the thickness and viscosity of the prime coat, while also improving the flexibility of the prime coat once applied, and to prevent cracking. The rheology modifying agents can include any polysaccharides that do not react significantly with other components of the composition, such as xantham gum, gum arabic, or another natural gum.

One or more alcohols can be added to the composition to improve the penetration of the prime coat into the base road, to avoid the possibility of air bubbles that can become trapped in the prime coat, and to enhance the flexibility of the cured prime coat, preventing cracking and increasing the rate of curing, to form a continuous, membrane film. Specifically, octyl alcohol exhibits favorable characteristics, as well as other alcohols, and antifoam and defoaming agents.

The composition can also include one or more other additives, including biocides, antifoam, and/or surfactants and/or wetting agents, which, in an embodiment, can include an 8 mole to 10 mole ethoxylate of nonylphenol.

The unique combination of asphaltine, a natural hydrocarbon resin, and other components in the present composition enables formation of an asphalt prime coat using a quantity of organic solvent at least ninety percent less than that used in conventional cutback asphalts, while retaining substantially equal effectiveness regarding penetration into a base road and formation of a water impermeable membrane. Further, when a hydrophobic wax is used to provide water impermeability to the prime coat, the present composition can be produced without any quantity of volatile organic solvents, while still retaining its full effectiveness, enabling production of an asphalt prime coat with no significant environmental impact.

In another embodiment, the present invention relates to an asphalt prime coat suitable for application to a base road that includes an asphaltine and an emulsion of a natural hydrocarbon resin and one or more penetrating components, as described previously, mixed with one or more dispersion agents, a rheology modifying agent, an alcohol, or combinations thereof.

The asphalt prime coat can include from 0.01 percent by weight to 5 percent by weight dispersion agent, in an embodiment, from 0.01 percent by weight to 3 percent by weight, and in a further embodiment, from 0.01 percent by weight to 0.03 percent by weight. The asphalt prime coat can include from 0.1 percent by weight to 1 percent by weight rheology modifying agent, in an embodiment from 0.1 percent by weight to 0.60 percent by weight, and in a further embodiment, from 0.1 percent by weight to 0.26 percent by weight. The asphalt prime coat can include from 3 percent by weight to 15 percent by weight asphaltine, in an embodiment from 3 percent by weight to 12 percent by weight, and in a further embodiment, from 3 percent by weight to 5 percent by weight. The asphalt prime coat can include from 5 percent by weight to 40 percent by weight natural hydrocarbon resin, in an embodiment, from 5 percent by weight to 20 percent by weight, and in a further embodiment, approximately 5 percent by weight. The asphalt prime coat can also include from 0.001 percent by weight to 2 percent by weight alcohol.

If hydrophobic wax is present, the asphalt prime coat can include from 1 percent by weight to 8 percent by weight hydrophobic wax, in an embodiment, from 1 percent by weight to 5 percent by weight, and in a further embodiment, from 1 percent by weight to 4.1 percent by weight. If an organic solvent is used, the organic solvent can include from 1 percent by weight to 10 percent by weight organic solvent, in an embodiment, from 1 percent by weight to 8 percent by weight, and in a further embodiment, from 1 percent by weight to 3 percent by weight Additionally, the asphalt prime coat can include one or more of: a surfactant, a biocide, and an antifoam agent. The asphalt prime coat can include from 0.1 percent by weight to 3 percent by weight surfactant, in an embodiment, from 0.1 percent by weight to 2 percent by weight, and in a further embodiment, from 0.1 percent by weight to 1 percent by weight. The asphalt prime coat can include from 0.01 percent by weight to 3 percent by weight biocide, in an embodiment from 0.01 percent by weight to 1 percent by weight, and in a further embodiment from 0.01 percent by weight to 15 percent by weight. The asphalt prime coat can include from 0.001 percent by weight to 0.3 percent by weight antifoam agent, in an embodiment from 0.001 percent by weight to 0.2 percent by weight, and in a further embodiment from 0.001 percent by weight to 0.1 percent by weight.

In a further embodiment, the present invention relates to a method for coating a base road with an asphalt prime coat.

The base asphalt prime coat is first formed by mixing an asphaltine, a natural hydrocarbon resin, and at least one additional component, which can include a hydrophobic wax, one or more dispersion agents, such as polyglycerine and/or water, an organic solvent, or combinations thereof. If an organic solvent is used, the hydrophobic wax and polyglycerine can be selectively omitted from the mixture. Conversely, if both hydrophobic wax and polyglycerine or another suitable dispersion agent are used, the organic solvent can be omitted.

The asphalt prime coat is then applied to the base road, such as by spraying, pouring, or sponging. The hydrophobic wax and/or the hydrocarbon resin emulsion prevents moisture from entering or exiting the base road, while the one or more dispersion agents and/or the organic solvent facilitate penetration of the asphalt prime coat into the base road. In an embodiment, the penetration of the prime coat can range from 0.5 inches to 2.0 inches, or more.

During the production process, a rheology modifying agent, an alcohol, a surfactant, a biocide, a defoaming agent, or combinations thereof, can be added to the asphalt prime coat.

In another embodiment, the present invention relates to a method for forming an asphalt prime coat.

An emulsion of a natural hydrocarbon resin can be formed, which can include mixing Gilsonite, or a similar natural hydrocarbon resin, with one or more penetrating components, which can include water, polyglycerine, one or more organic solvents, or combinations thereof.

A water-wet solution of asphaltine is also formed, which can include mixing asphaltine, or a similar mineral, with water, and in an embodiment, one or more dispersion agents.

The emulsion and water-wet solution can then be mixed to form a base mixture, to which additional components can be added, including a hydrophobic wax, such as paraffin or polyethylene wax, at least one dispersion agent, a rheology modifying agent, a surfactant, an antifoam or defoaming agent, a biocide, an alcohol, or combinations thereof.

The present embodiments thereby enable production and use of an environmentally friendly asphalt prime coat, having a significantly lower quantity of volatile organic compounds than other existing alternatives, and potentially no volatile organic compounds. The present asphalt prime coat can penetrate at least 0.5 inches into a base road structure, and can cure rapidly, within twenty-four hours, without requiring heating prior to application or blotting of excess material afterward.

DETAILED DESCRIPTION OF THE EMBODIMENTS

Before explaining the present embodiments in detail, it is to be understood that the embodiments are not limited to the particular descriptions and that the embodiments can be practiced or carried out in various ways.

The present embodiments provides a composition and methods of use and production relating to a prime coat for penetrating, bonding, and stabilizing a new or existing base road or similar surface to promote adhesion and a water-tight seal between the base road and an upper construction course, such as an asphalt road. Base roads can include any lower construction course, most commonly aggregate crushed limestone or concrete.

When no upper construction course is to be placed on the base road, the prime coat is usable to control dust and erosion by preventing loss and displacement of aggregate material and preventing the entry or exit of moisture from the base road.

In addition to roadways, the present composition can be applied to airport runways, bridges, entrance ramps, driveways, city plazas, and other large, weight bearing structures.

The present composition can include a base of asphaltine and an emulsion of a natural hydrocarbon resin. In an embodiment, the asphaltine can be provided in the form of a surfactant-treated water-wet or aqueous solution of asphalt or a similar mineral, mixed with water. The water can be distilled, deionized, and/or filtered, or obtained directly from any municipal, governmental, public, or private water supply. Any water that is substantially free of impurities that will interfere with the formation of an operable prime coat can be utilized. Typically, the water can be present in an amount ranging from 30 percent by weight to 90 percent by weight of the asphalt prime coat. The asphaltine can be present in an amount ranging from 3 percent by weight to 15 percent by weight of the asphalt prime coat.

In lieu of water, the asphaltine suspension can be prepared using a dispersion agent, such as Hydropalat™, made by Cognis, or a similar dispersion agent.

Asphaltine, as used herein, refers to natural compounds, as well as compounds created during the processing of crude oil, which can include sulfonated asphalt. Asphaltines are insoluble in water and soluable in organic solvents. In an embodiment, the asphaltine can be selected from minerals having a molecular weight ranging from 600 to 5000.

In an embodiment, the natural hydrocarbon resin can be provided in the form an emulsion, such as emulsified Gilsonite or a substantially similar mineral, mixed with a penetrating component, such as water, polyglycerine, or one or more organic solvents. The natural hydrocarbon resin can typically be present in an amount ranging from 5 percent by weight to 40 percent by weight of the emulsion.

The penetrating component functions as a dispersion agent for formation of the emulsion, fills gaps within the prime coat mixture and facilitates penetration into a base road structure, and provides the resulting prime coat with the ability to form a water-tight membrane, able to retain moisture within the base road. The retention of moisture within the base road facilitates the effectiveness of the prime coat as both an adhesive for securing the upper construction course, and as a means for preventing loss and displacement of any material from the base road.

Once the asphaltine and natural hydrocarbon resin base have been prepared and mixed, additional components can be added, as needed. For example, if an organic solvent is used to form the emulsion of the natural hydrocarbon resin, the interactions between the organic solvent and the natural hydrocarbon resin will cause the prime coat to cure and form a water impermeable membrane upon application. However, if no organic solvents are added, a hydrophobic wax can be added to the composition to facilitate curing and water impermeability of the prime coat.

In an embodiment, the hydrophobic wax can include paraffin wax emulsions, such as Paracol® 700 N, made by Hercules, Inc. of Wilmington, Del., or similar wax products, such as polyethylene wax emulsions. Typically, wax products can include any solid, non-reactive alkane hydrocarbon, having the formula $C_nH_{2n+2}$, with n equal to 20 to 40. Hydrophobic wax is typically present in an amount ranging from 1 percent by weight to 8 percent by weight of the asphalt prime coat.

If one or more organic solvents are used, the organic solvents can include odorless mineral spirits, such as Varsol 1, made by Exxon Mobil Chemical Company, or other similar organic solvents, which can include aliphatic and/or aromatic solvents. Organic solvents are typically present in an amount ranging from 1 percent to 10 percent by weight of the asphalt prime coat.

To prevent clumping during preparation of the prime coat, and to facilitate the penetration of the prime coat into the base road, one or more dispersion agents and/or defoaming agents can be added to the composition. Suitable dispersants can include polyglycerine, low molecular weight sodium polyacrylates, or similar materials and/or products, such as Hydropalat 44, made by Cognis, or Tamol™ 731A or 165A, made by Rohm and Haas. Defoamers, which can include octyl alcohol, made by JT Baker or Mallinckrodt, and antifoams, such as Antifoam 880, are also usable. Dispersion agents and/or antifoams are typically present in an amount ranging from 0.01 percent by weight to 12 percent by weight of the asphalt prime coat.

It is also desirable for the present composition to produce a prime coat having sufficient flexibility to dry and cure rapidly, resist cracking, and withstand the forces imparted by construction traffic shortly after application to a base road. In an embodiment, a rheology modifying agent can be added to improve flexibility, thickness, and viscosity of the prime coat.

The rheology modifying agent can include any high performance biopolymer usable for rheology control, including one or more polysaccharides that do not react significantly with other components of the composition or impair the functionality of the composition as a prime coat. In an embodiment, the rheology modifying agent can include xantham gum and/or gum arabic, which also prevents undesirable settling of components within the prime coat. Xantham gum is noteworthy for the fact that a very small quantity of xanthum gum is able to impart a significant improvement to the thickness, viscosity, and rheology of the prime coat. Other natural gums are also usable. Rheology modifying agents are typically present in an amount ranging from 0.1 percent by weight to 1 percent by weight of the asphalt prime coat.

The penetration and flexibility of the prime coat can further be improved through the addition of an alcohol. Octyl alcohol has exhibited the ability to provide the prime coat with improved resistance to cracking under pressure, in addition to the enhanced ability to penetrate into the base road. Octyl alcohol is also usable as a defoaming agent. One or more alcohols, which can include octyl alcohol, are typically present in an amount ranging from 0.001 percent by weight to 1 percent by weight of the asphalt prime coat.

In an embodiment, the composition can also include one or more surfactants, usable to reduce the surface tension and/or wetting properties of the mixture. Reduced wetting properties enable improved adhesion of the prime coat to the base road, and improved adhesion between the upper construction course and the prime coat. Additionally, surfactants are used as a bridge between water and oil phases, facilitating both manufacture of the prime coat and application of the prime coat to the base road.

Typically, non-ionic surfactants, such as an eight to ten mole ethoxylate of nonylphenol can be used. Suitable surfactant products can include NP 9.5, which is nonylphenol with about 9.5 moles of ethylene oxide or polypropylene glycol, such as Surfonic® N-95 Surfactant made by Huntsman, or similar products, such as Igepal CTA-639-W made by Rhodia, Inc, Surfynol CT 131 or 104 PG-50 made by Air Products, or Triton X-405 made by Cognis. Surfactants are typically present in an amount ranging from 0.1 percent by weight to 3 percent by weight of the asphalt prime coat.

The present composition can also include one or more biocides and/or mildewcides for maintaining the prime coat and underlying base road, preventing the growth of bacteria, insects, vegetation, mold, mildew, and other potentially damaging biological agents. Microbial and vegetation growth can hinder the effectiveness of the prime coat, as well as cause damage to the underlying base road or upper construction course. Biocides can be added both to control microbial growth, as well as to impart biostability to the cured prime coat. Suitable biocides can include Dowcil 75 made by Dow Chemical, Proxel GXL, made by Arch Chemicals, Inc., Kathon WT 1.5 made by Rohm and Hass, or other similar products, natural biocides, and/or man-made biocides. Biocides are typically present in an amount ranging from 0.01 percent by weight to 3 percent by weight of the asphalt prime coat.

In an embodiment, an antifoam agent, such as Foammaster®, made by Cognis, can be added to the composition, for preventing the formation of foam, thereby facilitating manufacture and application of the prime coat. Antifoam agents are typically present in an amount ranging from 0.001 percent by weight to 0.1 percent by weight of the asphalt prime coat.

To prepare the asphalt prime coat, an emulsion of a natural hydrocarbon resin, such as Gilsonite in polyglycerine or a limited quantity of an organic solvent, can be prepared, and an asphaltine suspension, such as a mixture of asphaltine in water or another dispersion agent, can be formed. The emulsion and solution can be mixed to form a base mixture, into which additional components can be added.

Additional components can include a hydrophobic wax, one or more dispersion agents, rheology modifying agents, surfactants, defoaming agents, biocides, alcohols, or combinations thereof, can be added to the base mixture.

All of the components can be mixed using any mixing method known in the art, including use of Banbury™ or similar mixers. During mixing, the temperature of the mixture can range from five degrees Fahrenheit to one hundred sixty degrees Fahrenheit. The components need not be heated to prepare the prime coat, however the temperature should be maintained sufficiently high to prevent settling or thickening that would hinder mixing or application of the prime coat. Also, the temperature should be maintained sufficiently low to prevent degradation of any components within the mixture.

The order of the addition of the components can be varied, however it is generally preferable to add all dry components to water and/or the wet components to promote a uniform dispersion. In an embodiment, the pH of the mixture can be maintained at a range of 5.5 to 10.5, such as through the addition of sodium hydroxide, however no specific pH is required to enable mixing of the components. The pH should be maintained within a range such that none of the components degrade.

The present asphalt prime coat can be formed through the following exemplary formulations:

TABLE 1

| COMPONENT | WEIGHT (lbs.) | PERCENT BY WEIGHT |
| --- | --- | --- |
| Water | 8,700.7 | 81.23 |
| Hydropalat 44 | 2.71 | 0.03 |
| Xanthum Gum | 26.82 | 0.25 |
| Asphaltine | 500 | 4.67 |
| Octyl Alcohol | 1.73 | 0.02 |
| NP9 Surfactant | 98.06 | 0.92 |
| Biocide | 15 | 0.14 |
| Foam Master | 0.37 | 0.0035 |
| Paracol 700 | 440.55 | 4.11 |
| Polyglycerine | 142.43 | 1.33 |
| Naturally occurring hydrocarbon resin | 782.92 | 7.31 |

TABLE 2

| COMPONENT | WEIGHT (lbs.) | PERCENT BY WEIGHT |
| --- | --- | --- |
| Water | 9,150.03 | 85.9569.945 |
| Hydropalat 44 | 2.71 | 0.03 |
| Xanthum Gum | 27.88 | 0.262 |
| Asphaltine | 500 | 4.70 |
| Octyl Alcohol | 1.73 | 0.002 |
| NP9 Surfactant | 129.18 | 1.21 |
| Biocide | 15 | 0.14 |
| Foam Master | 0.37 | 0.0035 |
| Organic Solvent | 227.93 | 2.14 |
| Naturally occurring hydrocarbon resin | 591 | 5.55 |

Once the present asphalt prime coat has been formed, it can be applied to a base road or similar structure through any conventional means, including spraying, such as through use of a hand sprayer, spray bar, or vehicle equipped with spraying means, pouring, sponging, or combinations thereof.

The prime coat can be applied on a base road surface with any thickness desired. In an embodiment, the thickness of the prime coat can range from about 5 mil to about 80 mil, or more. The prime coat can be applied in a quantity ranging from 0.15 gallons to 0.30 gallons per square yard of base road, in a continuous layer with few or no voids.

After application of the prime coat, the hydrophobic wax and/or the natural hydrocarbon resin emulsion with an organic solvent cures to form a water impermeable membrane that prevents moisture from exiting the base road, while the dispersion agent and/or the organic solvent, if present, can enable penetration into the base road structure of at least 0.5 inches.

Due to the ability of the present composition to form a superior prime coat without use of significant amounts of volatile organic compounds, the present composition is extremely environmentally friendly and provides a controllable prime coat usable even under hostile conditions. Additionally, components for the present composition are significantly less expensive than conventional prime coats.

Further, the present composition provides a much more rapid drying time than conventional prime coats, enabling construction traffic to traverse a base road after application of the prime coat much more quickly than instances where a conventional prime coat is used. Also, the prime coat formed through the present composition is water-tight and flexible, curing rapidly and resisting cracks or deformation, while providing a strong adhesive that exceeds the performance of asphalt emulsions and typical alternatives to cutback asphalts.

While these embodiments have been described with emphasis on the embodiments, it should be understood that within the scope of the appended claims, the embodiments might be practiced other than as specifically described herein.

What is claimed is:

1. A composition for an asphalt prime coat, the composition comprising:
   an asphaltine; and
   an emulsion comprising a hydrocarbon resin and at least one penetrating component, wherein said at least one penetrating component comprises:
   a) an organic solvent comprising less than or equal to 3 percent by weight of the composition;
   b) a hydrophobic wax mixed with water, polyglycerine, or combinations thereof; or
   c) combinations thereof,
   wherein said at least one penetrating component causes the composition to penetrate a depth into a base surface, and wherein the organic solvent, the hydrophobic wax, or combinations thereof cures to form a water impermeable membrane in contact with the base surface.

2. The composition of claim 1, wherein the hydrocarbon resin comprises a Gilsonite.

3. The composition of claim 1, wherein the hydrophobic wax comprises a paraffin wax emulsion, a polyethylene wax emulsion, or combinations thereof.

4. The composition of claim 1, wherein the organic solvent comprises an odorless mineral spirit, an aliphatic solvent, an aromatic solvent, or combinations thereof.

5. The composition of claim 1, further comprising a dispersion agent, and wherein said at least one penetrating component, the dispersion agent, or combinations thereof, provides the composition with a drying time of twenty four hours or less.

6. The composition of claim 1, further comprising a rheology modifying agent.

7. The composition of claim 6, wherein the rheology modifying agent comprises a non-reactive polysaccharide.

8. The composition of claim 7, wherein the non-reactive polysaccharide comprises xantham gum.

9. The composition of claim 1, further comprising an alcohol.

10. The composition of claim 9, wherein the alcohol comprises octyl alcohol.

11. The composition of claim 1, further comprising a surfactant.

12. The composition of claim 11, wherein the surfactant comprises an eight mole to ten mole ethoxylate of nonylphenol.

13. The composition of claim 1, further comprising a biocide.

14. The composition of claim 1, further comprising an antifoam agent.

15. The composition of claim 5, wherein the dispersion agent comprises from 0.01 percent by weight to 5 percent by weight of the composition.

16. The composition of claim 6, wherein the rheology modifying agent comprises from 0.1 percent by weight to 1 percent by weight of the composition.

17. The composition of claim 1, wherein the asphaltine comprises from 3 percent by weight to 15 percent by weight of the composition.

18. The composition of claim 9, wherein the alcohol comprises from 0.001 percent by weight to 2 percent by weight of the composition.

19. The composition of claim 1, wherein the hydrophobic wax comprises from 1 percent by weight to 5 percent by weight of the composition.

20. The composition of claim 1, wherein the natural hydrocarbon resin comprises from 10 percent by weight to 40 percent by weight of the composition.

21. The composition of claim 1, further comprising a surfactant, a biocide, a defoaming agent, or combinations thereof.

22. The composition of claim 21, wherein:
   the surfactant comprises from 0.1 percent by weight to 3 percent by weight of the composition;
   the biocide comprises from 0.01 percent by weight to 3 percent by weight of the composition;
   the defoaming agent comprises from 0.001 percent by weight to 0.3 percent by weight of the composition; or combinations thereof.

23. The composition of claim 1, wherein said at least one penetrating component causes the composition to penetrate at least 0.5 inches into a base surface.

24. A composition for an asphalt prime coat, the composition comprising:
   an asphaltine; and
   an emulsion comprising a hydrocarbon resin and an organic solvent, wherein the organic solvent comprises less than or equal to 3 percent by weight of the composition.

25. The composition of claim 24, wherein the organic solvent causes the composition to penetrate a depth into a base surface.

26. The composition of claim 25, wherein the organic solvent causes the composition to penetrate at least 0.5 inches into the base surface.

27. The composition of claim 24, wherein the organic solvent cures to form a water impermeable membrane in contact with the base surface.

28. The composition of claim 24, further comprising a dispersion agent, and wherein the organic solvent, the dispersion agent, or combinations thereof, provides the composition with a drying time of twenty four hours or less.

29. The composition of claim 24, further comprising octyl alcohol, an eight mole to ten mole ethoxylate of nonylphenol, a biocide, or combinations thereof.

* * * * *